United States Patent
Dittmann et al.

(10) Patent No.: US 11,463,268 B2
(45) Date of Patent: Oct. 4, 2022

(54) SENSOR CALIBRATION

(71) Applicant: International Business Machines Corporation, Armonk, NY (US)

(72) Inventors: Gero Dittmann, Zürich (CH); Jens Jelitto, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 204 days.

(21) Appl. No.: 16/572,863

(22) Filed: Sep. 17, 2019

(65) Prior Publication Data

US 2021/0083883 A1    Mar. 18, 2021

(51) Int. Cl.
*H04L 29/06* (2006.01)
*H04L 9/32* (2006.01)
*G06F 21/57* (2013.01)
*H04L 9/00* (2022.01)

(52) U.S. Cl.
CPC .......... *H04L 9/3268* (2013.01); *G06F 21/57* (2013.01); *H04L 9/321* (2013.01); *H04L 9/3247* (2013.01); *H04L 9/50* (2022.05)

(58) Field of Classification Search
CPC ..... H04L 9/3268; H04L 9/3247; H04L 9/321; H04L 2209/38; H04L 9/3239; H04L 63/00; H04L 2209/805; G06F 21/57; G06F 21/44; G06F 21/64
See application file for complete search history.

(56) References Cited

U.S. PATENT DOCUMENTS

| | | | | | |
|---|---|---|---|---|---|
| 4,621,204 | A * | 11/1986 | Loessel | ................. | H03M 1/445 327/342 |
| 5,468,374 | A * | 11/1995 | Knoll | ................. | G01N 27/3335 427/245 |
| 5,616,523 | A * | 4/1997 | Benz | ...................... | G01P 15/125 438/459 |
| 8,832,461 | B2 * | 9/2014 | Saroiu | ...................... | G06F 21/57 455/456.3 |
| 9,544,153 | B1 * | 1/2017 | Roskind | ................. | H04L 9/3268 |
| 10,083,291 | B2 * | 9/2018 | James | ................... | H04L 9/3268 |
| 10,365,132 | B2 * | 7/2019 | Agrawal | ................ | G01D 18/008 |
| 11,016,111 | B1 * | 5/2021 | Chuang | ............... | A61B 5/6807 |
| 11,086,334 | B2 * | 8/2021 | Fridman | .................. | H04N 7/18 |
| 11,196,556 | B2 * | 12/2021 | Wang | .................... | H04L 9/3247 |
| 2009/0044023 | A1 * | 2/2009 | Crumlin | ............. | G06F 3/03547 713/186 |

(Continued)

OTHER PUBLICATIONS

Hackel et al., "The Digital Calibration Certificate", Metrology for the Digitalization of the Economy and Society, 7 pages <https://oar.ptb.de/files/download/5a9803864c91840b9b2a3ce5>.

(Continued)

*Primary Examiner* — Jeremy S Duffield
*Assistant Examiner* — Hassan A Hussein
(74) *Attorney, Agent, or Firm* — Donald J. O'Brien

(57) ABSTRACT

A computer-implemented method for certified sensor readings from a sensor can be provided. The method includes calibrating the sensor, generating a digital certificate, signing, by the sensor, a measurement value with its private key of a public/private key pair, and sending, by the sensor, the signed measurement value such that the sensor is identifiable via its public key and the related generated digital certificate.

6 Claims, 8 Drawing Sheets

(56) References Cited

U.S. PATENT DOCUMENTS

| | | | |
|---|---|---|---|
| 2011/0178884 A1* | 7/2011 | Teicher | G06Q 20/29 705/16 |
| 2012/0283976 A1* | 11/2012 | Berman | G01N 27/04 702/85 |
| 2013/0067236 A1* | 3/2013 | Russo | G06F 21/73 713/189 |
| 2013/0223472 A1* | 8/2013 | Maston | G01K 15/00 374/2 |
| 2014/0121480 A1* | 5/2014 | Budiman | A61B 5/1495 600/309 |
| 2014/0337632 A1* | 11/2014 | Kimura | H04L 63/0428 713/176 |
| 2015/0121066 A1* | 4/2015 | Nix | G06F 21/445 713/155 |
| 2015/0134954 A1* | 5/2015 | Walley | H04L 63/0823 713/168 |
| 2015/0168932 A1* | 6/2015 | Dittmann | H05B 47/115 700/12 |
| 2016/0143075 A1* | 5/2016 | Tucker | H04M 15/8061 370/329 |
| 2016/0217325 A1* | 7/2016 | Bose | G11B 27/17 |
| 2017/0078101 A1* | 3/2017 | Maximov | H04L 9/3247 |
| 2017/0111933 A1* | 4/2017 | Wu | H04W 74/006 |
| 2018/0026799 A1* | 1/2018 | Pottier | H04L 9/30 713/156 |
| 2018/0183587 A1* | 6/2018 | Won | H04W 4/70 |
| 2019/0097794 A1* | 3/2019 | Nix | G06F 21/35 |
| 2019/0332101 A1* | 10/2019 | Castillo Castillo | G05B 13/047 |
| 2019/0334998 A1* | 10/2019 | Max | H04W 12/106 |
| 2019/0349204 A1* | 11/2019 | Enke | G06F 21/602 |
| 2020/0084050 A1* | 3/2020 | Mensch | H04L 9/3247 |
| 2020/0119969 A1* | 4/2020 | Niederfeld | H04L 69/326 |

OTHER PUBLICATIONS

Liu et al., "Software Abstractions for Trusted Sensors", MobiSys'12, Jun. 25-29, 2012, 14 pages <https://www.microsoft.com/en-us/research/wp-content/uploads/2016/02/tenor.pdf>.

Microsoft, "Azure IoT Edge certificate usage detail", Microsoft Azure, Sep. 12, 2018, 7 pages <https://docs.microsoft.com/en-us/azure/iot-edge/iot-edge-certs>.

Prophet, G., "Certificate authority solution for IoT manufacturers", Mar. 17, 2017, 2 pages <https://www.smart2zero.com/news/certificate-authority-solution-iot-manufacturers>.

Janjua et al., "Trusted Operations on Sensor Data", Published: Apr. 27, 2018, 21 pages <https://www.researchgate.net/publication/324810229_Trusted_Operations_on_Sensor_Data>.

Raciti et al., "Embedded Cyber-Physical Anomaly Detection in Smart Meters", 12 pages <https://www.ida.liu.se/labs/rtslab/publications/2012/RacitiNadjmTehrani-critis12.pdf >.

Parmar et al., "Malleable Cryptosystems and Their Applications in Wireless Sensor Networks", 15 pages <http://keyurparmar.in/Downloads/MCWSN.pdf>.

Ide, T., "Collaborative Anomaly Detection on Blockchain from Noisy Sensor Data", IBM Research, Nov. 17, 2018, 23 pages, <http://ide-research.net/papers/2018_BSDM_Ide_slides.pdf>.

Dittmann et al., "A Blockchain Proxy for Lightweight IoT Devices", 2019 Crypto Valley Conference on Blockchain Technology (CVCBT), pp. 82-85.

Mell et al., "The NIST Definition of Cloud Computing", Recommendations of the National Institute of Standards and Technology, Sep. 2011, 7 pages.

* cited by examiner

100

102 calibrating the sensor 104 generating a cryptographic certificate 106 signing, by the sensor,
a measurement value 108 sending, by the sensor,
the signed measurement value

FIG. 1

742 – RESOURCE PROVISIONING
744 – METERING AND PRICING
746 – USER PORTAL
748 – SERVICE LEVEL MANAGEMENT
750 – SLA PLANNING AND FULFILLMENT

762 – MAPPING AND NAVIGATION
764 – SOFTWARE DEVELOPMENT AND LIFECYCLE MANAGEMENT
766 – VIRTUAL CLASSROOM EDUCATION DELIVERY
768 – DATA ANALYTICS PROCESSING
770 – TRANSACTION PROCESSING
772 – CERTIFIED SENSOR CALIBRATOR

800
LEGEND FOR FIG. 7

FIG. 8

SENSOR CALIBRATION

STATEMENT REGARDING PRIOR DISCLOSURES BY THE INVENTOR OR A JOINT INVENTOR

The following disclosure(s) are submitted under 35 U.S.C. 102(b)(1)(A): "A Blockchain Proxy for Lightweight IoT Devices", G. Dittmann, J. Jelitto, 24-26 Jun. 2019, 2019 Crypto Valley Conference on Blockchain Technology (CVCBT), Rotkreuz, Switzerland.

BACKGROUND

The present disclosure relates generally to a sensor measurement, and more specifically, to a computer-implemented method for certified sensor readings from a sensor.

The Internet-of-Things (IoT) is one of the mainstream technologies driving the digitization of industry and government agencies. The IoT refers to the instrumentation of backend systems and/or the connection between transactional systems and the physical world, often using abstract real-world data. In other words, systems of record are connected to real physical conditions of hardware devices and their measurement values, e.g., environmental parameters. This can be useful for better system-to-human, as well as system-to-system communications. However, it is useful to ensure that the values measured by IoT devices deliver correct parameter values of real physical conditions. Hence, the data that comes from the expected device and the delivered measurement values are correct.

SUMMARY

According to one aspect of the present disclosure, a computer-implemented method for certified sensor readings from a sensor can be provided. The method can comprise calibrating the sensor, generating a digital certificate, signing, by the sensor, a measurement value with its private key of a public/private key pair, and sending, by the sensor, the signed measurement value such that the sensor can be identifiable via its public key and the related generated digital certificate.

According to another aspect of the present disclosure, a sensor for certified sensor readings can be provided. The sensor can comprise a control module adapted for receiving a calibration signal for a measurement unit of the sensor, a memory adapted for storing a generated digital certificate, a signing unit adapted for signing a measurement value with its private key of the sensor of a public/private key pair, and a sender adapted for sending the signed measurement value such that the sensor is identifiable via its public key and the related generated digital certificate.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

It should be noted that embodiments of the present disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the examples of embodiments, but to which the present disclosure is not limited.

Embodiments of the present disclosure will be described, by way of example only, and with reference to the following drawings:

FIG. 1 shows a block diagram of an example computer-implemented method for certified sensor readings from a sensor, in accordance with some embodiments of the present disclosure.

Figure 2:
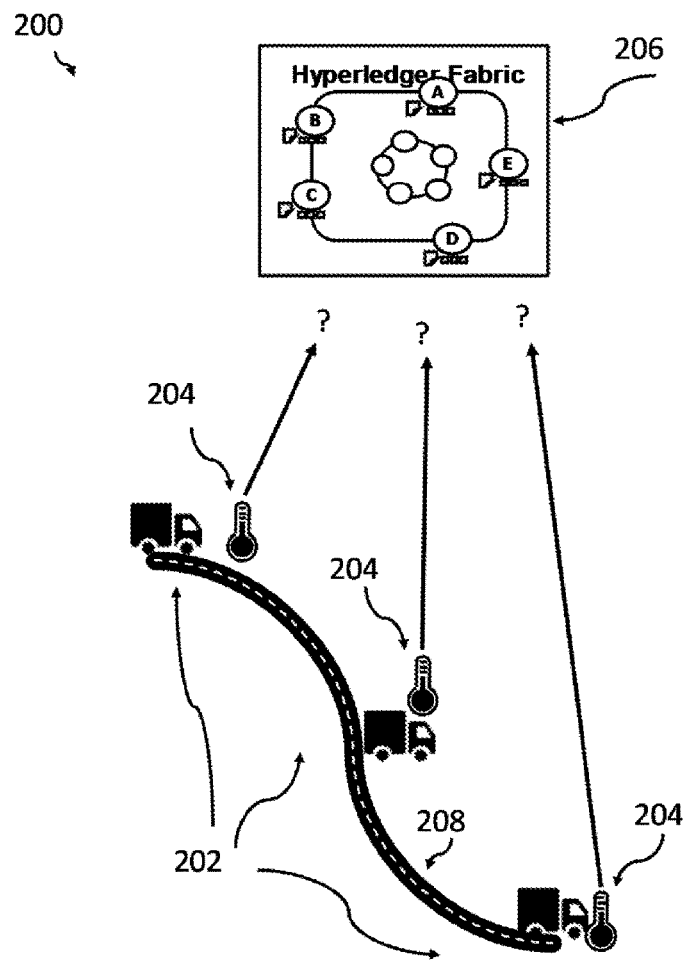

FIG. 2 shows a block diagram of an example system for sensor calibration, in accordance with some embodiments of the present disclosure.

Figure 3:
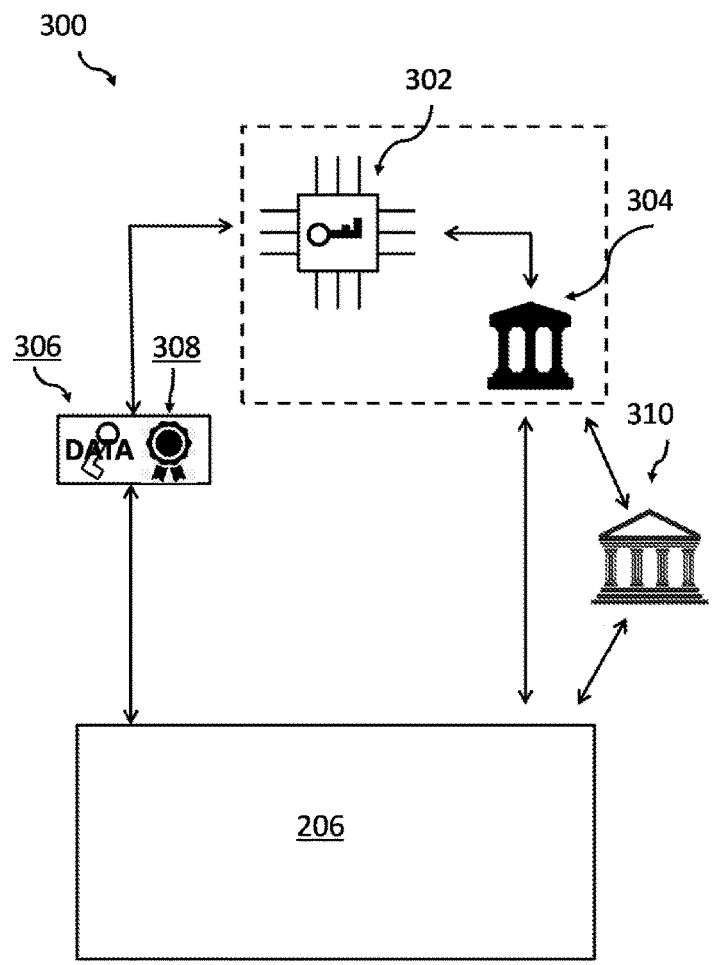

FIG. 3 shows a block diagram of an example system for sensor calibration, in accordance with some embodiments of the present disclosure.

Figure 4:
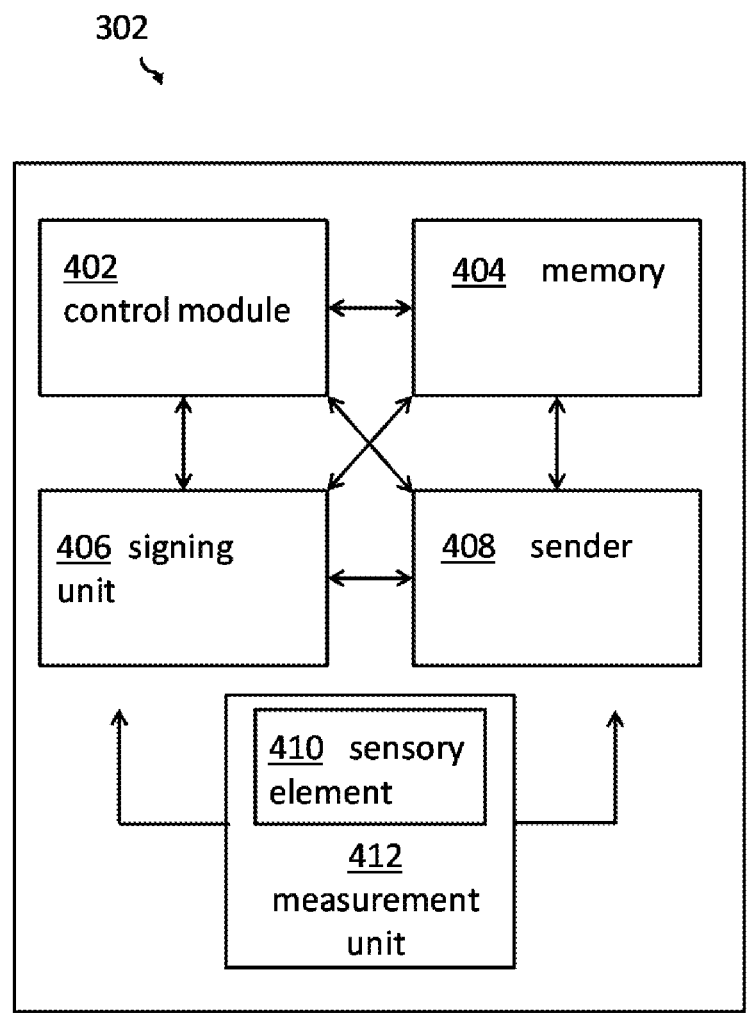

FIG. 4 shows a block diagram of an example sensor, in accordance with some embodiments of the present disclosure.

Figure 5:
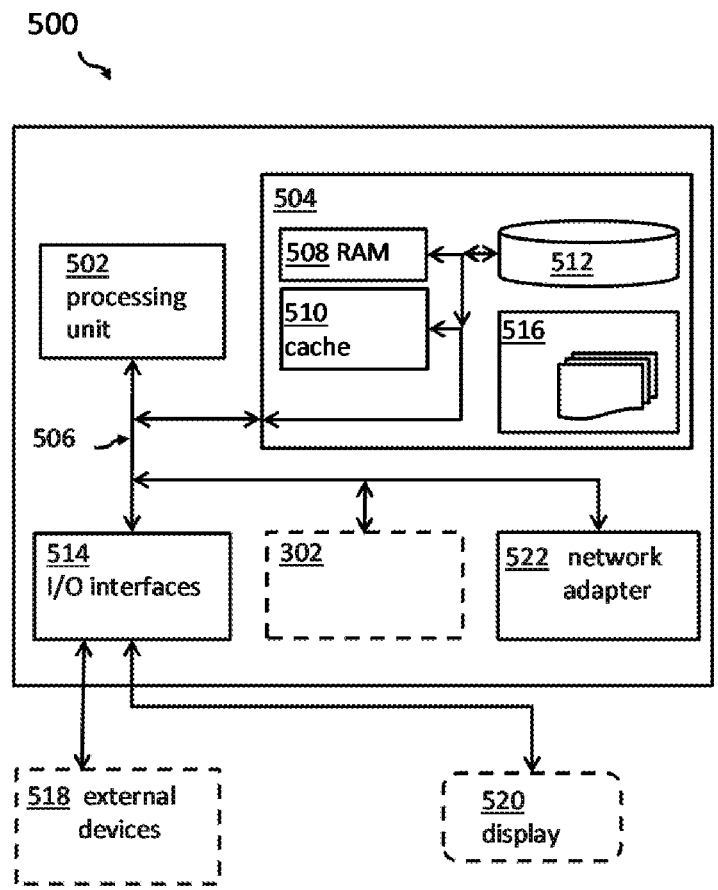

FIG. 5 shows a block diagram of an example computing system for sensor calibration, in accordance with some embodiments of the present disclosure.

Figure 6:
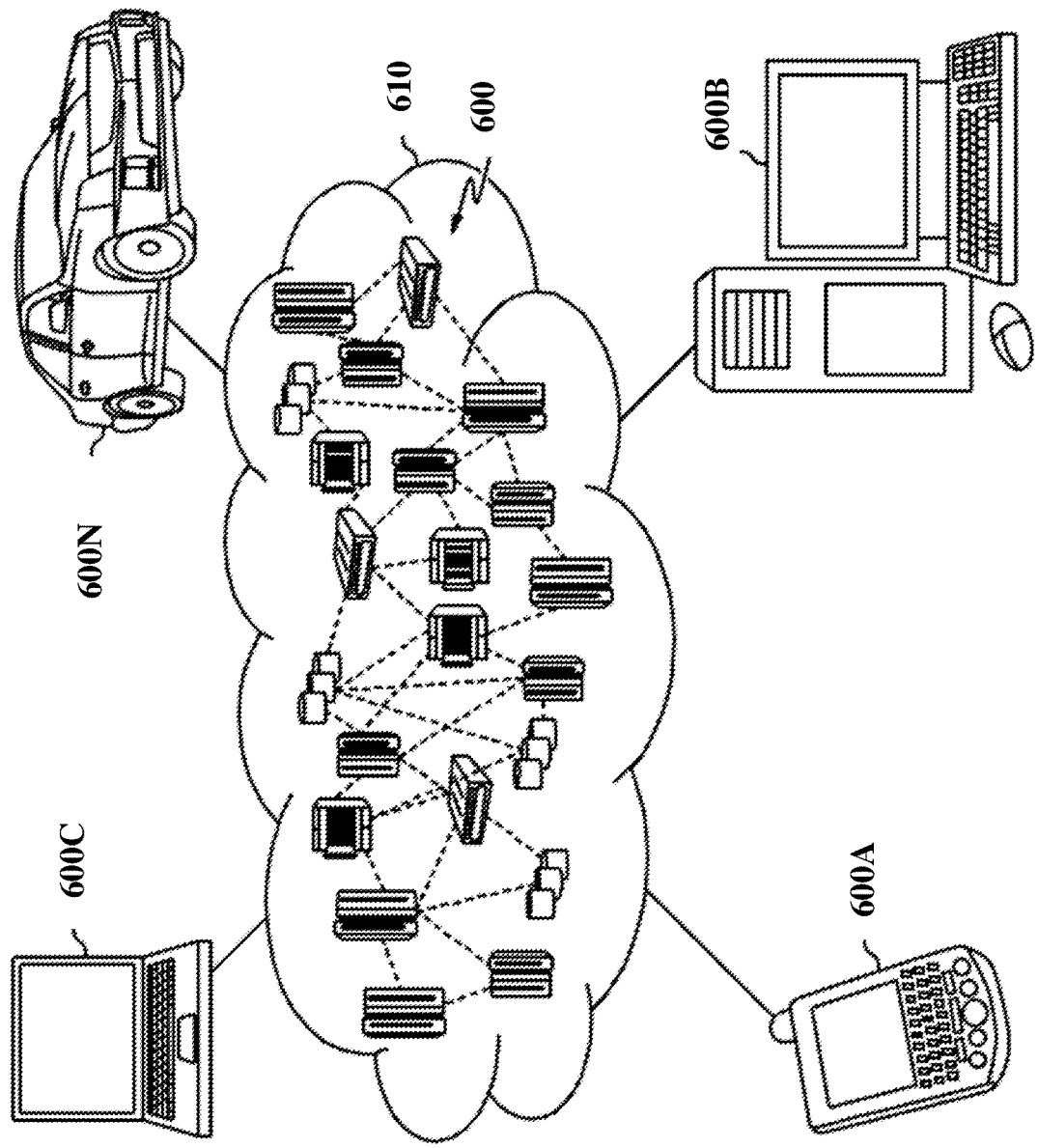

FIG. 6 depicts a cloud computing environment, according to some embodiments of the present disclosure.

Figure 7:
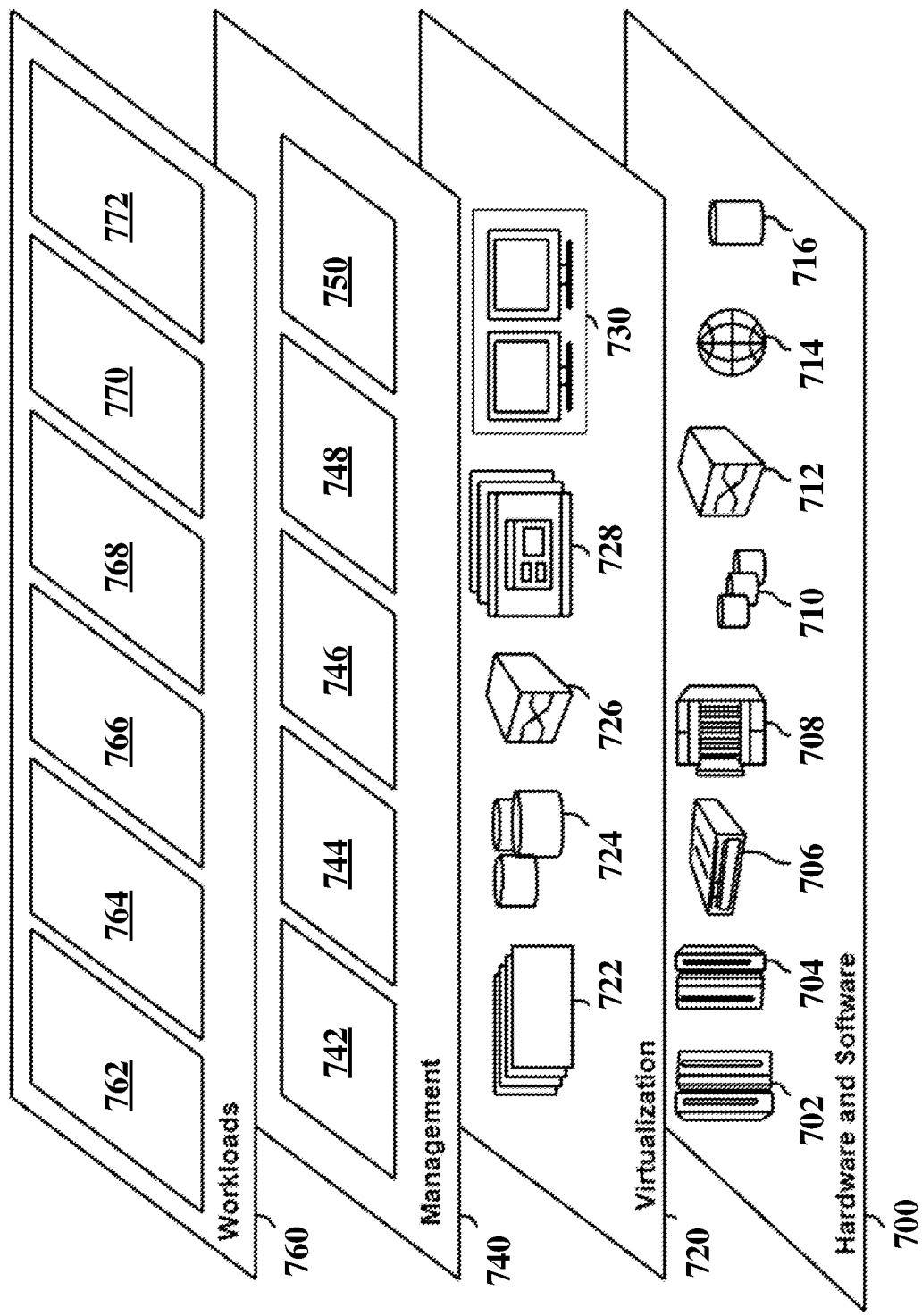

FIG. 7 depicts abstraction model layers, according to some embodiments of the present disclosure.

FIG. 8 depicts a legend for FIG. 7, according to some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Coherence of data is useful for sensors in consumer devices, in logistic and manufacturing/production environments, as well as in environmental technologies. Another example can be the seamless control of cold-chains in supply chain environments. Further, data collection, shock detection and other areas are affected by IoT devices. In addition, block chain technologies are gaining popularity as enterprise IT platforms for different parts of large enterprises. As such, questions like, "How does one ensure that the readings of an IoT device are correct?;" "How does one trust that the data comes from a specific IoT device?;" and, "How does one ensure that the data has not been altered on its way to a block chain?;" can be relevant in digitized environments. Similar questions can be answered in the field of digital twins of physical devices that repeatedly deliver data about their statuses.

In the context of this description, the following conventions, terms and/or expressions can be used:

The term, "certified sensor readings," can denote measurement values of a sensor having a trustworthy identity and producing trustworthy, non-manipulated (e.g., intentionally falsified during a cyber-attack) measurement values.

The term, "sensor," can denote an electronic device configured to measure real world parameters such as temperature, humidity, resistance, speed, acceleration, capacitance, distance, concentration of chemical components, rotation, and many more. The type of real world parameter may not limit the proposed concept. The sensor can comprise a sensory element, a plurality of semiconductor components used for delivering functions of a smart sensor. The smart sensor can provide additional functionality—often implemented in the form of embedded software—which goes beyond a simpler concept of a sensory element. The mentioned additional functions can also be implemented as part of a gateway such that parts of the additional functions can be shared among a plurality of sensory elements.

The term, "calibrating," can denote the process of setting internal parameters of a sensor in a way that reliable and reproducible measurement values can be generated that correspond to actual physical parameter values in the real world.

The term, "digital certificate," can denote a code proving ownership of a certain identity. The certificate can include information about a specific key, information about the related identity of its owner (often called the subject), and a digital signature of an entity that has verified the certificate's content (often called the issuer). If a signature is valid, and the software examining the certificate trusts the issuer, then this software can use that key to communicate securely with the certificate's subject. In particular, the digital certificate—e.g., in form of a cryptographic certificate—can originate from a public key infrastructure (PKI), or alternatively to the PKI infrastructure. In some embodiments, the sensor can hold at least one DID (Decentralized IDentifier). The calibration authority can issue a W3C verifiable credential that allows the sensor to prove to a verifier that it has been calibrated and certified by the authority. In addition, the sensor's DID document can hold the calibration result (applied calibration standard, measurement conditions, deviation curves, etc.). In this sense, the digital certificate can be seen as a cryptographic certificate.

The term, "public/private key pair," can denote a tool for cryptographically protecting information sent over public networks. The private part of the key pair can never be shared, whereas the public portion of the key pair can be made available to communication targets of the owner of the private key. Data being encrypted with a public key cannot be decrypted without the private key of the same public/private key pair.

The term, "certified authority system," can denote a system or entity which can have been certified by another trusted entity or trusted system. The other trusted entity can be government controlled and can have a higher level of trustworthiness. The certified system or certified authority system can act as a representative of the trusted system for a certain environment, e.g., to ensure a calibration of mass-market components (e.g., a scale in a shop).

The term, "backend system," can denote a receiving unit of measurement values of the sensor. This can be a real-time control system for robotic or logistic or warehouse control systems or, alternatively, transactional systems logging and tracking environmental values relating to physical goods. The backend system can be implemented in form of a node of a blockchain system. However, any other backend system used in technical or commercial environments can be used.

The term, "trusted authority," can denote the highest layer of trusted systems within the proposed concept. The trusted authority or trusted authority system can guarantee the identity of the certified authority system or certified authority or certified system.

The term, "blockchain system," can denote a plurality of connected nodes managing to gather a growing list of records (transaction records) organized in blocks that are linked using cryptography. Each block can contain a cryptographic hash of the previous block, a timestamp, and transaction data. A blockchain can build a basis for a hyper-ledger system.

The proposed computer-implemented method for certified sensor readings from a sensor can offer multiple advantages, contributions and technical effects:

Firstly, the proposed concept can ensure that IoT devices or sensors of such devices are calibrated and deliver reliable measurement values. Additionally, with the mentioned advantage, it can also be ensured that a backend system can rely on the identity of the sensor. This can be achieved by the digital certificate with which the sensor can sign its measurement values.

These two features combined can ensure that reliable measurement values of sensors can only be used as long as the sensor is expected to be calibrated. Thus, a link between the calibration expiration term and the term of the digital certificate can build the bridge between the two otherwise independent parameters.

The proposed concept also opens up a number of additional options, like a reliable integration of measurement values into blockchain systems, so that an end-to-end trusted environment can be created. In particular, the generation of measurement values and its communication to other systems can be free of potential manipulation (not cyber-attack altered).

According to embodiments of the present disclosure, in an additional step after the calibration, the calibration authority certifies the sensor calibration and software (i.e., preprocessing schemes) that can allow trusted data preprocessing at the sensor side (e.g., data compression, data aggregation, data analytics, etc.).

In the following, additional embodiments—applicable to the method as well as to the system—will be described:

According to some embodiments, the method can also include sending, by the sensor, the related digital certificate alongside the measurement value. This can allow a receiving unit—e.g., a backend system—collecting a plurality of data from a plurality of sensors for further processing and integration in, e.g., transactional systems—to rely on the received data, as well as the identity of the specific sensor. Thus, there are not only trusted data but also a trusted source of the data from the computing network edge.

According to some embodiments, the method can also include suppressing the sending of the related or associated digital certificate for a predefined number of times signed measurement values are sent. Thus, not every measured environmental data can need to be transmitted together with the digital certificate. This can be sent periodically, e.g., every 10th time (any other regular or irregular sequence can be possible), when sending a measurement value. This can also be applied to a sending of a collection of measurement values. This can reduce the network traffic volume and can guarantee almost the same trust and the related sensor.

According to some embodiments, the method can also include generating the digital certificate after a successful calibration of the sensor. Hence, digital certificates can be limited to working sensors. As a consequence, the receiver of the measurement value(s) can be ensured that correct values—i.e., values that correspond to real physical world parameters—have been measured by a certified device.

According to some embodiments, an expiration time value of the calibration can be equal to an expiration time value digital certificate. In other words, the calibration expiration term=expiration term of the certificate. This way, no measured sensor value(s) can successfully be sent if one can no longer fully trust the measured data. This can be seen as an insurance against compromised measurement values of sensors.

According to some embodiments, the calibration and the generation of the digital certificate can be performed by a certified authority system. Such a certified authority system can be operated by an organization responsible for performing calibrations of technical systems. Such organizations can exist in every country and they can be government controlled. Hence, the receiver of the sensor data can be ensured that the calibration as well as the certificate used by the sensor can have a reliable degree of trustworthiness.

According to some embodiments, the method can also include receiving the sent signed measurement value by a backend system and verifying the identity of the sensor via the signature and the certified authority system. For this, the backend system can communicate with the trusted certifying system being in charge of certifying the authority system. This way, a double check can be performed in terms of the identity of the sensor, as well as the integrity of the measured transmitted data.

According to some embodiments, the certified authority system can be certified by a trusted authority, i.e., the just mentioned trusted certifying system. Alternatively, or in addition, the trustworthiness of the certified authority system can be guaranteed by a whitelisting of the certified authority system, e.g., in backend systems, the trusted authority or another "whitelisting server" provided to be used by a plurality of backend systems. This can also protect the trusted authority from, e.g., overload or increased probability for cyber-attacks.

According to some embodiments, the backend system can be a node of a blockchain system. However, the backend system may not be limited to block chain systems. Also centralized backend systems can be used. However, the use of the proposed method and related system in the context of blockchains can become a standard implementation over time if traceable and documented measurement values can be used at a later point in time.

According to some embodiments, the method can also include storing a plurality of measurement values in the sensor (i.e., in its memory), signing, by the sensor, the plurality of measurement values with its private key of the public/private key pair, and sending, by the sensor, the plurality of signed measurement values. Thus, a certain plurality of measurement values can be stored in the memory of the sensor and can only be sent after a trigger event occurs. Such a trigger event can be an overflow in the internal memory of the sensor, the end of a time period, a predefined number of measurement values, or any other suitable trigger event condition. As a consequence, the communication frequency of the sensor can be reduced which can also reduce electrical power (useful if the sensor is battery-operated). Additionally, network traffic can be reduced which can be advantageous if narrow-bandwidth communication media can be used for a plurality of sensors.

According to some embodiments, the calibrating can also include certifying a software component executable by the sensor. This feature can ensure, that not only a sensory component in the sensor works as designed but also controlled software—e.g., embedded software—can have the right version and release, i.e., may not be compromised.

In the following, a detailed description of the figures will be given. All instructions in the figures are schematic. Firstly, a block diagram of some embodiments of an example computer-implemented method for certified sensor readings from a sensor is given. Afterwards, further embodiments, as well as embodiments of the sensor for certified sensor readings, will be described.

FIG. 1 shows a block diagram of an example computer-implemented method 100 for certified sensor readings from a sensor, in accordance with some embodiments of the present disclosure. The method 100 includes calibrating, 102, the sensor. This can happen under defined conditions at the place of a certified authority which can exist in every country/jurisdiction. Examples can be the TUeV in Germany or the NIST in the United States of America.

The method 100 includes also generating, 104, a digital certificate (e.g., a cryptographic certificate). It can be issued by the certified authority and can be made available to (a) the sensor or (b) (in)directly to a back-end. At the same time, the software—e.g., embedded systems software—of the sensor can be checked in a way to ensure that no manipulation has been made to the software and that the latest version can be used. The term of the digital certificate can be valid as long as the calibration of the sensor keeps its validity, and vice versa.

Additionally, the method 100 includes signing, 106, by the sensor, a measurement value, i.e., a reading of the sensor with a private key of the sensor. As mentioned above, the certificate can have been received from a certified authority. The private key of a public/private key pair can have been provided by the certified authority or can have been generated by the sensor itself. Other alternatives for obtaining a public/private key pair can be used.

Further, the method 100 includes sending, 108, by the sensor, the signed measurement value such that the sensor is identifiable—in particular by a third party/backend system—via its public key and the related generated digital certificate. Thereby, the digital certificate may not be sent together with a measurement value. It can also be retrieved from the certified authority or from another trusted system. Also, signing and sending a measurement value(s) can be delayed until a certain number of measurement values have been collected by the sensor.

The sensor can include also another component: a sensory element. The sensory component can be used to measure raw data for temperature, humidity, an actual position (e.g., by a GPS [global positioning system], rotation, tilt, concentration of chemical or biochemical compositions). Other measurement options include also status information (binary), resistance, capacitance, distance, speed, acceleration and many more. The here proposed method and the related system is not limited to a specific type of measurement value.

One or more sensors can also be connected to a preprocessor, concentrator or gateway such that a smart sensor can be implemented in form of a simple, dump sensory element (eventually with some preprocessing capabilities) and a more sophisticated portion of the sensor including all "higher level" functions like signing, sending and storing measurement values. This can reduce the size (footprint) and complexity of the sensory element. It can also be implemented in a form that the sensory element may not use any power (i.e., a passive measurement sensor, or powered by energy harvesting) or that the power can be received from the gateway.

FIG. 2 shows a block diagram of an example system 200 for sensor calibration, in accordance with some embodiments of the present disclosure. The system 200 can be related to a cold chain of, e.g., transported food, drugs, organs to be transplanted or, comparable temperature sensitive goods. For each case, it can be that the temperature of the transported goods can stay within a predefined value range and/or not going beyond a threshold temperature value. The transportation cold chain can be symbolized by the truck 202, and the sensor can be symbolized by the thermometer 204. The thermometer 204 temperature-controlled goods can be in thermal contact for reliable measurement values. Along the cold chain temperature, measurement values can be sent to a backend system 206 for keeping track (besides other tasks, e.g., current geo-position) of the temperature of the goods over time. To symbolize the continuous transport of the goods, a portion of a road 208 is used as a symbol. However, in general, the transportation can include transportation by means of ships, trucks and airplanes and others.

In some embodiments, the backend system 206 (compare FIG. 2) can be implemented as a block chain system, e.g., a hyper-ledger fabric, keeping track of transactions over time in a reliable way. A hyper-ledger fabric can be a platform for distributed ledger solutions using a modular architecture with relatively high degrees of confidentiality, scalability, and resiliency. The hyper-ledger fabric can support pluggable modules that accommodate a variety of economic ecosystems. The hyper-ledger fabric can include peers and orderers. The peers, also referred to as peer nodes, can be computing devices that host ledgers and contracts. More specifically, the peers use the orderers to help ensure that the ledger is current on all peers. The orderers can collect transactions, update proposals, and order, e.g., sort, the proposals. Additionally, the orderers can package the ordered proposals together into blocks. The blocks are thus distributed to the peers.

FIG. 3 shows a block diagram of an example system 300 for sensor calibration, in accordance with some embodiments of the present disclosure. The system 300 includes a backend system 206, sensor 302, certified authority system 304, measurement data 306, certificate 308, and trusted entity 310.

The sensor 302 can—for calibration purposes—physically be transported into the physical environment of the certified authority system 304. This can ensure that the certified authority system 304 and the sensor to be calibrated are related to the same physical conditions such that a calibration of the sensor 302 can be performed in a reliable way (symbolized by the dashed box surrounding the sensor 302 and the certified authority 304).

After the calibration, the sensor 302 can be installed "in the field" (remote to the authority system 304) and can communicate its measurement values (encrypted data 306), e.g., to the backend system 206. The arrows in the figure can essentially illustrate communication path between different components. Thus, the sensor 302 can measure measurement data—using a sensory element (not shown)—and sign the measured data (one or more measurement values) as a preparation to send the data 306 to the backend system 206. The one or more measurement data 306 can be protected by a private key of the sensor 302. Hence, the backend system 206 can use the related public key in order to decrypt the received signed data.

The backend system 206 can have received the related public key of the sensor 302 from the certified system 304 in an initiation phase of the overall system. In some embodiments, the backend system 206 can communicate with the certified system 304 over a communications network access point (not shown).

Optionally, the sensor can also send—as integral part or separate during the same data transmission—a certificate 308 for the purpose of ensuring the identity of a specific sensor 302. The sensor 302 can have received the certificate 308 from the certified authority 304 during the calibration process. Alternatively, the identity of the sensor 302 can be ensured by receiving the public portion of the public/private key pair used for the signature of the measured data via the certified authority 304. This way, the proof that measurement data have been received from an expected sensor can be implemented via the public key of the sensor 302.

The certified authority 304 can receive its certification from a trusted system of a trusted entity 310. The backend system 206 can also communicate with the trusted entity 310 in order to ensure the trustworthiness of the certified authority 304. This way, a two-layer certification environment can be created for the identity of the sensor 302 as well as its delivered measured data values.

FIG. 4 shows a block diagram of an example sensor 302, in accordance with some embodiments of the present disclosure. The sensor 302 includes a control module 402 that is adapted for receiving a calibration signal for a measurement unit 412 of the sensor 302. A memory 404 is adapted for storing a generated digital certificate. The memory 404 (or another memory) can also be adapted for storing measurement values, measurement software, controlled software, etc.

The signing unit 406 is adapted for signing a measurement value (or a plurality of measurement values) with the private key of the sensor of the sensor's public/private key pair. Additionally, the sensor 302 includes a sender 408 adapted for sending the signed measurement value such that the sensor is identifiable via its public key and the related generated digital certificate.

Furthermore, the measurement unit 412 can also include a sensory element 410 delivering real measurement values of physical environmental conditions to the measurement unit 412. The measurement unit 412 can perform some preprocessing—e.g., normalization—of the raw measurement values. It can too be noted that this preprocessing can also be performed in a gateway or concentrator or the like, as mentioned above, such that the sensory element 410 and other components of the sensor 302 can be physically separated. However, such an implementation can be transparent to the proposed concept.

It can also be understood that beside the sender 408 also a receiver (not shown) can be part of the sensor 302 in order to receive—among others—calibration signals, software updates and/or trigger signals for delivering measurement values. Alternatively, sender 408 and receiver can be integrated into a transceiver or modem unit.

Embodiments of the present disclosure can be implemented together with virtually any type of computer, regardless of the platform being suitable for storing and/or executing program code. FIG. 5 shows a block diagram of an example computing system 500 for sensor calibration, in accordance with some embodiments of the present disclosure.

The computing system 500 can be suitable for executing program code related to the proposed method, e.g., in a node of the backend system, and the certified authority system, the certification authority or trusted authority and/or the gateway. The computing system 500 can also be implemented as an embedded system as part of the sensor. In this case, some of the below described components—e.g., the monitor, long-term storage, etc.—may not be part of the computing system.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that can be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 can be described in the general context of computer system-executable instructions, such as program modules, being executed by a computer system 500. Generally, program modules can include routines, programs, objects, components, logic, data structures, and so on that perform particular tasks or implement particular abstract data types. Computer system/server 500 can be practiced in distributed cloud computing environments where tasks are performed by remote processing devices that are linked through a communications network. In a distributed cloud computing environment, program modules can be located in both, local and remote computer system storage media, including memory storage devices.

As shown in the figure, computer system/server 500 is shown in the form of a general-purpose computing device. The components of computer system/server 500 can include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media can be any available media that is accessible by computer system/server 500, and it includes both, volatile and non-volatile media, removable and non-removable media.

The system memory 504 can include computer system readable media in the form of volatile memory, such as random access memory (RAM) 508 and/or cache memory 510. Computer system/server 500 can further include other removable/non-removable, volatile/non-volatile computer system storage media. By way of example only, a storage system 512 can be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media can be provided. In such instances, each can be connected to bus 506 by one or more data media interfaces. As will be further depicted and described below, memory 504 can include at least one program product having a set (e.g., at least one) of program modules that are configured to carry out the functions of embodiments of the present disclosure.

The program/utility, having a set (at least one) of program modules 516, can be stored in memory 504 by way of example, and not limiting, as well as an operating system, one or more application programs, other program modules, and program data. Each of the operating systems, one or more application programs, other program modules, and program data or some combination thereof, can include an implementation of a networking environment. Program modules 516 generally carry out the functions and/or methodologies of embodiments of the present disclosure, as described herein.

The computer system/server 500 can also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 can communicate with one or more networks such as a local area network (LAN), a general wide area network (WAN), and/or a public network (e.g., the Internet) via network adapter 522. As depicted, network adapter 522 can communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the sensor 302 for certified sensor readings can be attached to the bus system 506—e.g., of a local support computer—or can be linked—e.g., via communication network—to the computer system 500.

Referring now to FIG. 6, which depicts a cloud computing environment 610, according to some embodiments of the present disclosure. As shown, cloud computing environment 610 includes one or more cloud computing nodes 600. The cloud computing nodes 600 can perform the method described in FIG. 1 and/or the functionality discussed in FIGS. 2-7. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Referring now to FIG. 7, which depicts abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 include hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and certified sensor calibrator 772.

FIG. 8 depicts a legend 800 for FIG. 7, according to some embodiments of the present disclosure.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for certified sensor readings from a sensor, the method including:
   calibrating the sensor;
   generating a digital certificate after a successful calibration of the sensor, wherein calibrating the sensor and generating the digital certificate is performed by a certified authority system;
   signing, by the sensor, a measurement value with a private key of a public/private key pair for the measurement value, wherein an expiration time value of the calibration of the sensor is identical to an expiration time value of the generated digital certificate, wherein the calibration of the sensor indicates that the sensor generates reproducible measurement values that accurately correspond to physical parameter values;
   sending, by the sensor, the signed measurement value such that the sensor is identifiable via a public key of the public/private key pair and the generated digital certificate;
   sending, by the sensor, the generated digital certificate with the signed measurement value;
   suppressing sending of the generated digital certificate for a predefined number of times that the signed measurement value is sent;
   receiving the sent, signed measurement value by a backend system, wherein the backend system is a node of a blockchain system; and
   verifying an identity of the sensor via a signature of the sent, signed measurement value and the certified authority system.

2. The method according to claim 1, wherein the certified authority system is certified by a trusted authority, and wherein a trustworthiness of the certified authority system is guaranteed by the certified authority system.

3. The method according to claim 1, further including:
   storing a plurality of measurement values in the sensor;
   signing, by the sensor, the plurality of measurement values with the private key of the public/private key pair for the measurement value; and
   sending, by the sensor, the plurality of signed measurement values.

4. A sensor for certified sensor readings, the sensor including:
   a computer processing circuit; and
   a computer-readable storage medium storing instructions, which, when executed by the computer processing circuit, are configured to cause the computer processing circuit to perform a method comprising:
   receiving a calibration signal for a measurement unit of the sensor, wherein the calibration signal indicates a certification of an embedded software component executable by the sensor;
   storing a generated digital certificate, wherein the generated digital certificate is generated after a successful calibration of the sensor, wherein the certification and the generation of the digital certificate is performed by a certified authority system;
   signing a measurement value with a private key of a public/private key pair for the sensor, wherein an expiration time value of a calibration of the sensor is identical to an expiration time value of the generated digital certificate, wherein the calibration of the sensor indicates that the sensor generates reproducible measurement values that accurately correspond to physical parameter values;
   sending the signed measurement value such that the sensor is identifiable via a public key of the sensor and the generated digital certificate;
   sending, by the sensor, the generated digital certificate with the signed measurement value;
   suppressing sending of the generated digital certificate for a predefined number of times that the signed measurement value is sent; and verifying, by a backend system, an identity of the sensor via a signature of the sent, signed measurement value and the certified authority system, wherein the backend system is a node of a blockchain system.

5. The sensor according to claim 4, wherein the instructions, when executed by the computer processing circuit, are configured to cause the computer processing circuit to certify, by a trusted authority, the authority system, and wherein a trustworthiness of the certified authority system is guaranteed by the certified authority system.

6. A computer program product for certified sensor readings from a sensor, the computer program product comprising one or more non-transitory computer readable storage media, and program instructions collectively stored on the one or more computer readable storage media, the program instructions comprising instructions configured to cause one or more processors to:

calibrate the sensor, wherein the sensor is calibrated by certifying an embedded software component executable by the sensor;

generate a digital certificate after a successful calibration of the sensor, wherein calibrating the sensor and generating the digital certificate is performed by a certified authority system;

sign a measurement value with a private key of a public/private key pair, wherein an expiration time value of a calibration of the sensor is identical to an expiration time value of the generated digital certificate, and wherein the successful calibration indicates that the sensor generates reproducible measurement values that accurately correspond to physical parameter values;

send the signed measurement value such that the sensor is identifiable via a public key of the public/private key pair and the generated digital certificate;

send the generated digital certificate with the signed measurement value; and suppress sending of the generated digital certificate for a predefined number of times that the signed measurement value is sent;

receive the sent, signed measurement value by a backend system, wherein the backend system is a node of a blockchain system; and verify an identity of the sensor via a signature of the sent, signed measurement value and the certified authority system.

* * * * *